US009079655B2

United States Patent
Vela Orge et al.

(10) Patent No.: US 9,079,655 B2
(45) Date of Patent: Jul. 14, 2015

(54) SYSTEM FOR INCREASING CONTROLLABILITY FOR AN AIRCRAFT

(75) Inventors: Pilar Vela Orge, Aranjuez (ES); Arnaud Namer, Bourrasol (FR); Angel Pascual Fuertes, Alcobendas (ES); Francisco Javier Simon Calero, Majadahonda (ES)

(73) Assignee: Airbus Operations, S.L., Getafe (ES)

( * ) Notice: Subject to any disclaimer, the term of this patent is extended or adjusted under 35 U.S.C. 154(b) by 214 days.

(21) Appl. No.: 13/227,816

(22) Filed: Sep. 8, 2011

(65) Prior Publication Data

US 2012/0138738 A1 Jun. 7, 2012

Related U.S. Application Data

(63) Continuation of application No. PCT/ES2010/070141, filed on Mar. 11, 2010.

(30) Foreign Application Priority Data

Mar. 12, 2009 (ES) .................................. 200900687

(51) Int. Cl.
*B64C 9/10* (2006.01)
*B64C 5/02* (2006.01)

(52) U.S. Cl.
CPC ... *B64C 9/10* (2013.01); *B64C 5/02* (2013.01); *Y02T 50/32* (2013.01); *Y02T 50/44* (2013.01)

(58) Field of Classification Search
CPC .......... B64C 13/00; B64C 9/24; B64C 13/30; B64C 9/10; Y02T 50/32; Y02T 50/44
USPC .................................... 244/87, 210, 214, 221
See application file for complete search history.

(56) References Cited

U.S. PATENT DOCUMENTS

| | | | | |
|---|---|---|---|---|
| 2,720,368 A | * | 10/1955 | Payne, Jr. | 244/223 |
| 3,207,458 A | * | 9/1965 | Kean | 244/87 |
| 3,847,369 A | * | 11/1974 | Phillips et al. | 244/210 |
| 4,030,688 A | | 6/1977 | Pellarini | |
| 4,043,523 A | * | 8/1977 | Bartoe, Jr. | 244/87 |
| 4,790,494 A | | 12/1988 | Kohn | |
| 5,823,471 A | | 10/1998 | Dazet | |
| 7,963,484 B2 | | 6/2011 | Raudszus et al. | |
| 8,191,824 B2 | * | 6/2012 | Shaheen et al. | 244/76 A |

(Continued)

FOREIGN PATENT DOCUMENTS

| | | |
|---|---|---|
| DE | 40 06 761 C1 | 9/1991 |
| ES | 2 140 046 T3 | 2/2000 |

(Continued)

OTHER PUBLICATIONS

International Search Report issued Jul. 9, 2010 in PCT/ES2010/070141.
Office Action issued Jul. 9, 2013, in Chinese Patent Application No. 201080020758.1, (with English Translation).

*Primary Examiner* — Valentina Xavier
(74) *Attorney, Agent, or Firm* — Oblon, McCelland, Maier & Neustadt, L.L.P.

(57) ABSTRACT

The system includes deflection transmission means (16) to provide a deflection position of the high-lift device (8) for each setting angle position of an adjustable HTP (2). Preferably, the deflection transmission means (18,20,23) comprise essentially of a mechanical linkage connected between the high-lift device (8) and the aircraft (1).

16 Claims, 4 Drawing Sheets

(56) References Cited

U.S. PATENT DOCUMENTS

| 8,496,204 | B1 * | 7/2013 | Charafeddine et al. | 244/99.4 |
| 2007/0241236 | A1 * | 10/2007 | Whitehouse et al. | 244/214 |
| 2010/0084515 | A1 | 4/2010 | Jaggard | |

FOREIGN PATENT DOCUMENTS

| GB | 998895 | 7/1965 |
| GB | 1010042 | 11/1965 |
| WO | WO 2008/084260 A2 | 7/2008 |

* cited by examiner

SYSTEM FOR INCREASING CONTROLLABILITY FOR AN AIRCRAFT

FIELD OF THE INVENTION

This invention relates to the aeronautical industry, more particularly to the field of aircraft design, being intended for its implementation in the horizontal tail plane of an aircraft.

OBJECT OF THE INVENTION

The technical problem addressed in the invention is to provide a system that lets the design size of the Horizontal Tail Plane (HTP) of an aircraft to be reduced. Thus reducing the weight and the aerodynamic drag of the aircraft and, as a consequence, the aircraft operational costs.

The invention is intended for an aircraft that incorporates an "adjustable HTP", which is conventional in commercial aircraft. Adjustable HTPs incorporate a "trim system" for providing a tilting movement for the entire HTP at a given angle ("setting angle") with respect to the aircraft, producing a change in the HTP angle of attack. The trim system function is to automatically provide "longitudinal" balance to the aircraft, i.e. without any need for pilot intervention. For "longitudinal" is understood "with respect to the pitching movement of the aircraft. In this way, when the required stable longitudinal balance is modified by the pilot using the elevator, changing engine thrust or operating the wing high-lift devices, the adjustable HTP will automatically tilt to provide the necessary lift for the new stable balance position and with the elevator in its normal position.

In the design of an aircraft for a given HTP configuration and geometric characteristics (span, dihedral angle, sweep angle, thickness, twist, profile shape, etc.), HTP size is basically governed by a compromise between longitudinal stability (static and dynamic) and aircraft controllability.

Aircraft stability is defined as the capability of the aircraft to recover the balance from small perturbations in the airspeed and/or angle of attack of the aircraft when in balance automatically, i.e. without the intervention of the pilot, and to continue maintaining this balance. Longitudinal stability is that related to aircraft pitching movement.

In simple terms, HTP influence on aircraft longitudinal stability depends on the centre of gravity of the aircraft (c.g.), which is variable during aircraft operation and on a coefficient that characterises the HTP size that is known as the HTP volume. The further away the c.g. is located from the HTP and the larger the HTP is, it results in greater aircraft longitudinal stability.

Additionally, the controllability of an aircraft is defined as its capability to provide the necessary forces and moments to allow any required manoeuvre to be performed. In particular, longitudinal controllability is the capability of the aircraft to provide sufficient lift to produce the necessary pitch moment.

Aircraft longitudinal controllability is given by the HTP aerodynamic characteristics via the HTP lift coefficient in function of its angle of attack which, in general, is different from that of the aircraft's angle of attack because the presence of the wing and its high-lift devices modify the HTP angle of attack by an amount known as "downwash angle". For a given HTP configuration (given a setting angle), the HTP lift coefficient presents a maximum and a minimum, with maximum (positive sign) HTP angle of attack and a minimum (negative sign) respectively; these maximum and minimum values are called stall values and are the values at which substantial aerodynamic stall occurs.

Once the minimum HTP design size has been determined in order to comply with the longitudinal stability criteria, depending on aircraft type, it is usually necessary to increase the horizontal tail aerodynamic area with respect to the referred minimum size in order to ensure compliance with controllability criteria, in such cases it is said that the aircraft design is limited by controllability criteria. The increase in the aerodynamic area means that the necessary lift coefficient does not exceed the stall values for the required manoeuvres in such cases.

The technical problem addressed by this invention is directed to reduce the size of an adjustable HTP in aircraft designs limited by controllability, in other words, with a minimum HTP size determined by longitudinal stability criteria. The invention thus provides a system to increase aircraft controllability, which, in turn, provides an increase in the HTP lift coefficient, allowing a reduction of HTP size and of total aircraft weight, thus contributing the advantage of reduced aircraft operating costs.

PRIOR ART OF THE INVENTION

In order to achieve an increase in the lift coefficient of aerodynamic surfaces, the high-lift devices are well-known in the prior art, and they are conventionally used in wings. There are many different types of high-lift devices, which are used alone or in combination with others and, in general, either modify the outer form of the profile (movable high-lift devices), or are devices that control the boundary layer (boundary layer suction or blowing systems) in order to delay separation and hence, stall.

Movable high-lift devices are devices that move with respect to the wing (high-lift device defection movement) and are based on providing chord lengthening or variations in the curvature of the profile. The devices are activated by the pilot, normally for manoeuvres in which the aircraft requires greater lift, such as take-off and landing. There are usually two common ways of deflecting the high-lift devices: (a) use an actuator to extent and retract it; or (b) use an electric motor which through a series of driven shafts, gear boxes, and mechanical linkages produces the required extension or retraction.

The direct installation of high-lift devices in the HTP would provide a possible solution to the technical problem addressed in this invention, since for stall values, the operation of the devices would provide additional lift, which would enable the effective HTP surface to be reduced, together with its size, for controllability criteria. This solution is known in the prior art applied to the AN-70 aircraft, which has a "slat" type high-lift device in the leading edge that is deflected when the wing flaps are deflected. However, it is considered that this solution in particular and the direct installation of adjustable high-lift devices in the HTP in general, are not fully satisfactory with respect to this technical problem because of the drawback of the device installation and operational complexity, together with an aircraft weight penalty because of the actuators or electric motor system that would have to be implemented.

Alternatively, fixed high-lift devices are known installed on the HTP leading edge (CBA-123 aircraft). These devices provide an increase in lift for high values of HTP angles of attack; however, they have the drawback that consist in which the lift improvement at high angles of attack leads to a worsening in lift or drag for other HTP angle of attack values.

DESCRIPTION OF THE INVENTION

In order to solve the technical problem addressed, the invention incorporates movable high-lift devices installed in the HTP, with the function of increasing the HTP lift coefficient.

Additionally, in order to overcome the mentioned drawbacks in the technical field, this invention seeks the following technical effects:

First: to take advantage of HTP tilting movement in order to transmit it to the deflection movement of an HPT high-lift device;

Second: to provide an increase in the HTP lift coefficient in a selective way over the full range of HTP angle of attack values, in particular for HTP stall values.

The first technical effect enables the invention system constitution to be simplified and in particular, to eliminate the need of installing actuators or motors for the high-lift device deflection.

The second technical effect enables adequate high-lift device deflection to be produced in order to increase the HTP lift coefficient in absolute value, depending on the various HTP angles of attack, without any detriment in lift and drag at other angles of attack values.

Basically, the solution proposed in this invention is based on linking the high-lift device deflexion with the tilting movement produced by the adjustable HTP trim system. The function that links said deflection movement with the tilting movement is called the "deflection law".

One technical aspect to be considered about said deflection law provided by the invention system is that in adjustable HTPs, taking into account that the trim system function is to balance the aircraft longitudinally, the HTP angle of attack increases in absolute value when the HTP setting angle increases in absolute value. Consequently, the HTP stall values are reached with maximum HTP tilting in absolute values. Since the maximum deflections in absolute values must be provided for the stall values, it can be deduced that a deflection law that provides an increasing deflection in absolute values is feasible over the full range of angles of attack because HTP tilts between the maximum and minimum setting angles do not produce any stall values.

In order to provide said link between the adjustable HTP movement and the high-lift devices deflection movement, the invention system comprises the following technical elements:

Coupling means between the HTP and the aircraft, comprising: HTP pivoting means, a trim system and deflection transmission means; and Coupling means between the high-lift device and the HTP.

The pivoting means are those that provide the articulated coupling between the adjustable HTP and the aircraft, comprising a pivoting shaft around which the HTP tilting movement is produced with respect to the aircraft.

The trim system provides the force required to the HTP tilting movement with respect to the aircraft around the pivoting means. Conventionally, the trim system comprises actuating means connected to the aircraft, which may consist of a jack-screw actuator.

The deflection transmission means provide the force required to produce the deflection movement of the high-lift device.

The invention system is characterised in that the deflection transmission means provide a high-lift device deflection position for each HTP tilting position. In this way, the invention system provides a link between the tilting movement and the deflection movement of the high-lift device, which is defined by a deflection law.

The deflection transmission means can incorporate a mechanical linkage connected between the high-lift device and the aircraft, which enables ad hoc actuators to be eliminated for the high-lift device deflection. The mechanical linkage is a system of technical elements (bars, guides, gears and cams etc) that move with respect to each other and are connected together by means of various types of joints (bolts and pins etc), for the purpose of transmitting movements and forces. Thus, in the case of the deflection transmission means essentially consisting of a mechanical linkage connected between the high-lift device and the aircraft, the invention system provides a law of defection between the high-lift device deflection movement and the HTP tilting movement.

BRIEF DESCRIPTION OF THE DRAWINGS

As a complement to the invention description and in order to assist in better understanding of its technical characteristics, this descriptive report is accompanied by the following figures:

FIG. 5.—a perspective view of a preferred invention system embodiment.

REFERENCES

Figure 1:
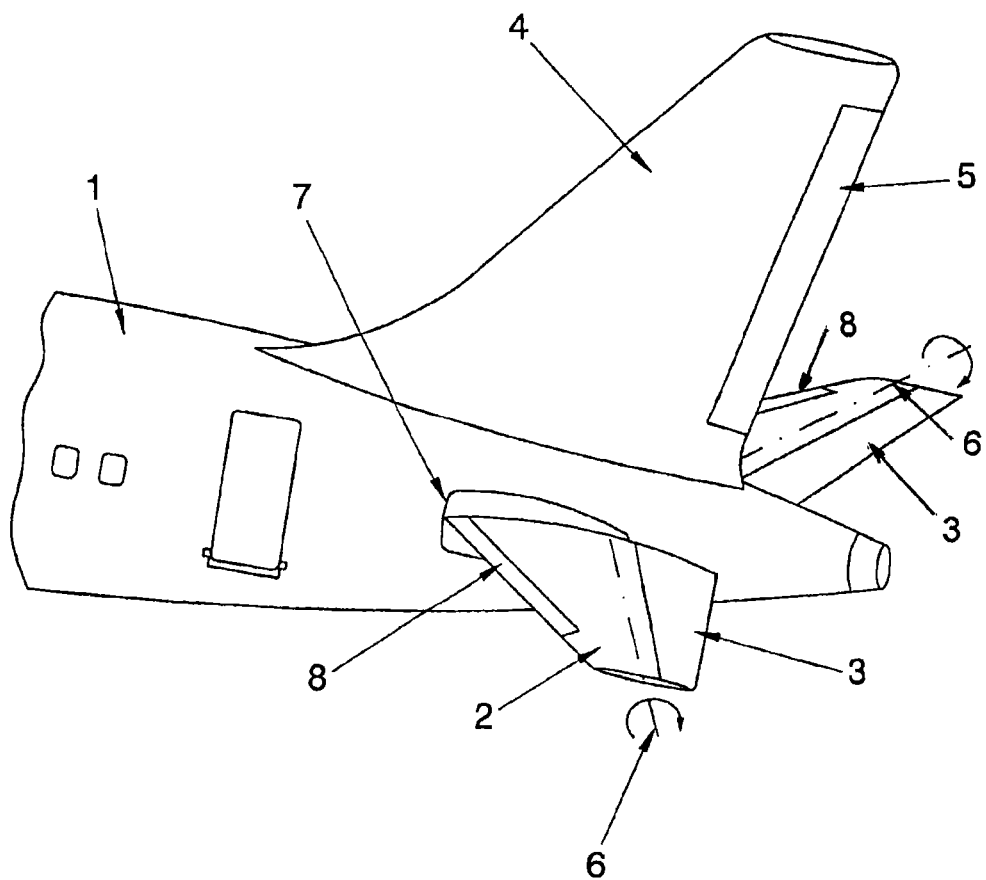
FIG. 1.—a perspective view of a first adjustable HTP installation in the aircraft tail, where the invention system is implemented.

1: Aircraft
2: HTP (Horizontal Tail Plane)
3: Elevator
4: Vertical stabiliser
5: Rudder
6: Pivoting shaft
7: Trim window
8: High-lift device
9: Trim system
10: Actuating means
11: Jack-screw
12: Tilting means
13: Threaded female piece
14: Knuckle
15: Tilting shaft
16: Deflection transmission means
17: Deflection shaft
18: Bar
18': Bar
19: Guide 20: Yoke
21: HTP torsion box structure
22: Extension
23: Anchor shaft
24: HTP Skin

DESCRIPTION OF A PREFERRED EMBODIMENT

Figure 2:
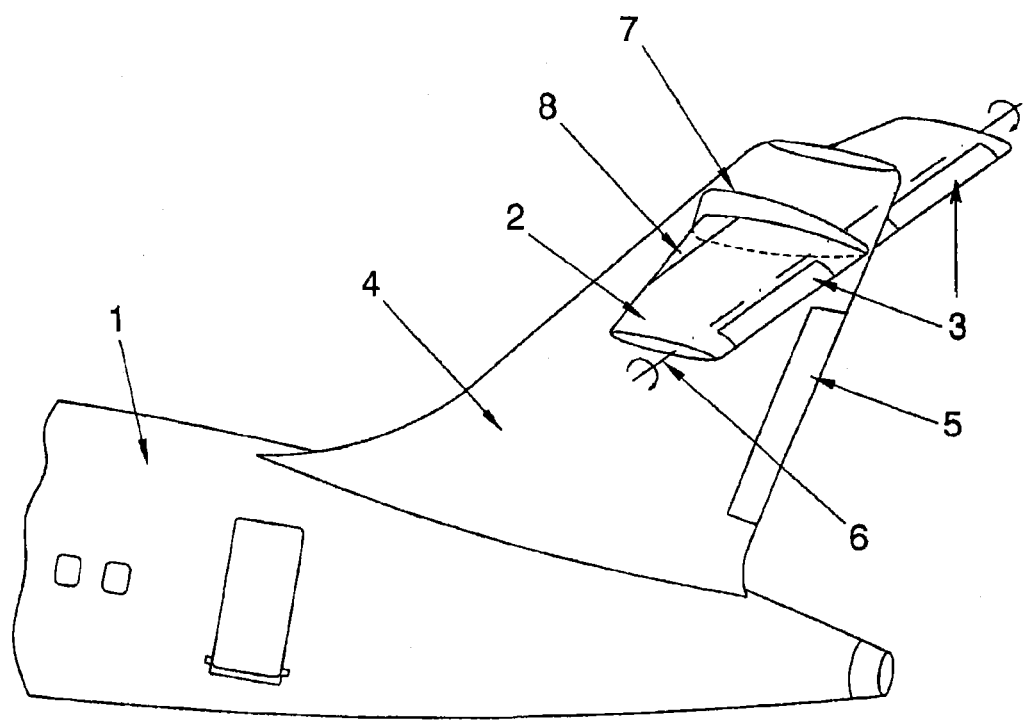
FIG. 2.—a perspective view of a second adjustable HTP installation in the aircraft tail, where the invention system is implemented.

The invention is intended for an aircraft fitted with an adjustable HTP (2). FIGS. 1 and 2 show the main parts of the aircraft (1) tail, where the HTP (2) is installed: the elevator (3); the vertical stabiliser (4) and the rudder (5).

Each of FIGS. 1 and 2 corresponds to two different HTP (2) arrangements, but where this HTP (2) arrangement factor does not limit the invention.

FIGS. 1 and 2 also show how the HTP (2) projects from the aircraft (1) structure via the trim window (7), the adjustable HTP (2) tilts with respect to the aircraft (1) around the pivoting means. The pivoting means comprise a pivoting shaft (6) around which the HTP (2) rotates with respect to aircraft, thus tilting the HTP (2). There may be more than one non-aligned pivoting shaft (6), with this not being a limiting characteristic of the invention, nor are the particular geometric characteristics of the HTP (2) (deflection and dihedral etc).

One of the characteristics of the invention is that it incorporates an adjustable high-lift device in the HTP (2). The adjustable high-lift device (8) in the preferred embodiment is, just as shown in the drawings, a "Droop Nose" type device, which is a leading edge high-lift device that is characterised in that the coupling means between the device (8) and the HTP (2) consists of articulation means with a deflection shaft (17) around which the device rotates with respect to the HTP (2), with the high-lift device (8) deflection being the rotation movement around a deflection shaft (17). This type of high-lift device (8) provides the technical advantage that lets both positive and negative angles of rotation with reference to the HTP (2) profile chord, which endows the system with greater functionality over the entire range of HTP (2) angle of attack values.

FIGS. 3 and 4 are drawings showing invention system embodiments with a mechanical linkage between the high-lift device deflection movement and the HTP (2) tilting. The embodiments differ on the type of mechanism incorporated into the deflection transmission means (16). The drawings shows how the HTP (2) is tilted with respect to the aircraft around the pivoting shaft (6) (articulation A), when the trim system (9), which comprises actuating means (10) with a jack-screw (11) and tilting means (12) to adequately transmit the tilting movement, moves the tilting means (12) around the pivoting shaft (6), and rotates the HTP (2) around the tilting shaft (15) (articulation B). Because of the produced tilting movement, the system provides a deflection of the high-lift device (8) comprising of the rotation around the deflection shaft (17) (articulation C).

The system shown in FIG. 3, incorporates a mechanism with a bar (18) that articulates with the aircraft (1) (articulation E) and also with a second bar (18') (articulation D) which, in turn, is integrally connected to the high-lift device (8).

The system shown in FIG. 4, incorporates a guide mechanism that comprises a guide (19) along which a sliding bar (18') articulates (articulation D') and which is integrally connected to the high-lift device (8). This guide mechanism, as shown in FIG. 4 provides a law of deflection for any high-lift device in accordance with the geometry of the sliding guide (19) path. In particular, the embodiment of FIG. 4 shows how the guide path between points "a" and "b" is concentric with pivoting articulation "A", which enables the high-lift device (8) not to deflect with respect to the HTP (2) profile chord.

The systems shown in FIGS. 3 and 4 correspond to two embodiments without any limitations to the goal of this invention because, by employing mechanisms known in the state of the art it would be possible to produce other embodiments included within the scope of this invention implementing said mechanisms as deflection transmission means (16).

Considering the criteria for positive deflection angle signs with high-lift device (8) rotation above the HTP (2) profile chord line and positive setting angle with rotation above the aircraft's (1) horizontal plane, the chosen law of deflection for the preferred embodiment is such that a positive HTP (2) setting angle with respect to the aircraft (1) produces a negative deflection angle of the "Droop Nose" high-lift device (8). The different system positions can be seen in the respective FIGS. 3a to 3c and 4a to 4c.

Figure 3A:
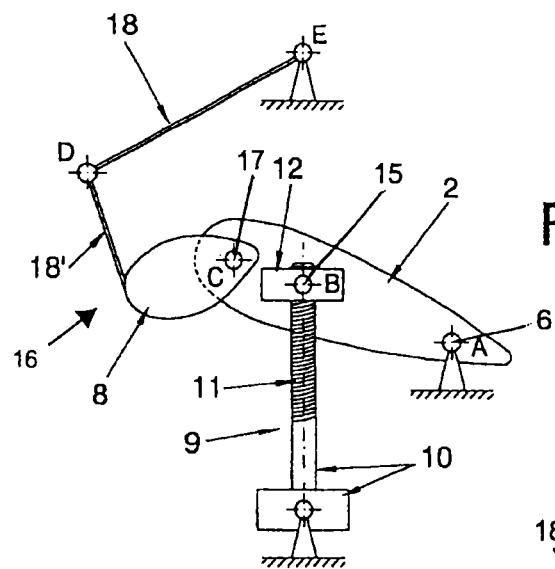
FIG. 3.—a diagram of an embodiment of the invention system. In this embodiment, the deflection transmission means comprise a bars mechanism. The hatched area represents a fixed part of the aircraft, with respect to which the HTP tilts; the circles represent articulations. The three FIGS. 3A, 3B and 3C) represent different positions of the system, corresponding to various HTP setting angles with their respective high-lift device deflection positions.
Figure 3B:
Figure 3C:
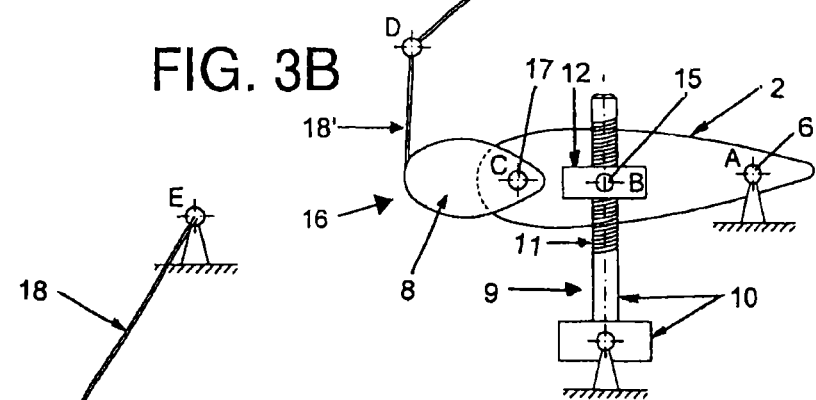
Figure 3C:
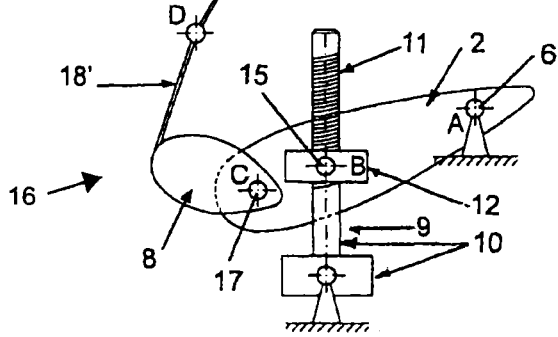
Figure 4A:
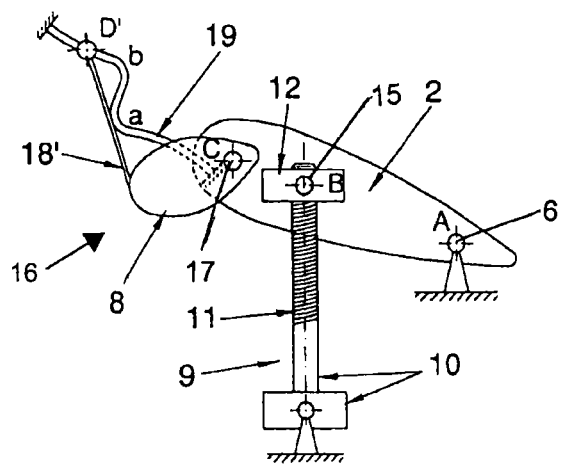
FIG. 4.—Functional drawing of an invention system embodiment. In this embodiment, the deflection transmission means comprise a mechanism with a guide. The hatched area represents a fixed part of the aircraft, with respect to which the HTP tilts; the circles represent articulations. The three FIGS. 4A, 4B and 4C) represent different positions of the system, corresponding to various HTP setting angles with their respective high-lift device deflection positions.
Figure 4B:
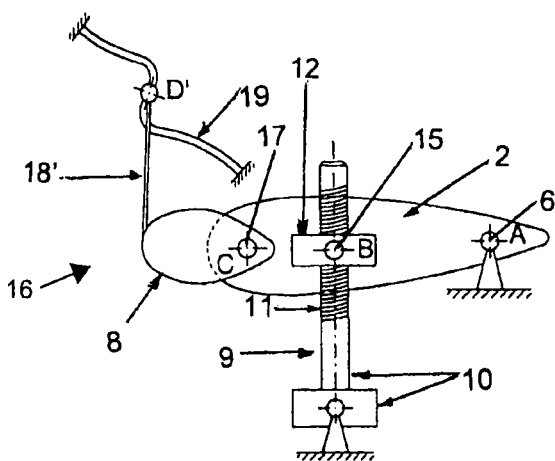
Figure 4C:
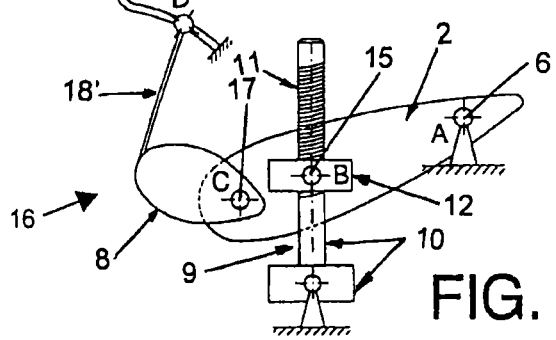

The preferred embodiment of the invention to which this section refers for the purpose of clarifying the technical elements of the invention, providing the necessary descriptive sufficiency, corresponds to the example in FIGS. 3a and 3b. The mechanism incorporated into this embodiment apparently includes advantageous simplicity in system construction as well as installation and maintenance, which is desirable considering the nature of the invention.

FIG. 5 shows a perspective view of this embodiment, the technical characteristics of which are described below. The position shown corresponds to a positive maximum setting angle with a negative maximum "Droop Nose" deflection angle in absolute value. This figure shows the area next to the leading edge of HTP (2) installed on the aircraft (1), showing it protrudes from this through the trim window (7). The figure also shows the HTP (2) structure (21) under the HTP (2) covering (24) through a cut-away representation in the covering.

The "Droop Nose" high-lift device (8) articulates with the HTP (2) by means of extensions (22) from the HTP (2) structure (21). For this reason, the device (8) incorporates a deflection shaft (17) that articulates with said extensions (22).

HTP (2) tilting is achieved by the trim system and the pivoting means. The trim system of the represented embodiment comprises actuating means (10) using a jack-screw (11) that is connected to a threaded female piece (13). In turn, this threaded female piece (13) is connected to a knuckle (14), one for each left and right part of the HTP (2). In addition, the knuckles (14) articulate with the HTP (2) structure via an tilting shaft (15). In the figure, the pivoting means are represented by a pivoting shaft (6), with respect to which the HTP (2) tilts.

Thus, the "Droop Nose" device (8) deflection is obtained as a result of HTP (2) tilting of both the left and right parts of the HTP (2), by deflection transmission means (16) comprising a yoke (20) and two bars as follows: The "Droop Nose" device (8) is integrally connected to a yoke (20), having the function of transmitting adequate torsion torque to the deflection shaft (17); the yoke (20) being pivotally connected with two bars (18) each one of which articulates with the aircraft (1) structure by an anchor shaft (23) fixed to the aircraft (1).

The invention claimed is:
1. A system for increasing controllability of an aircraft with an adjustable HTP (horizontal tail plane), which comprises:
 a movable leading edge high-lift device in the HTP;
 coupling means between the high-lift device and the HTP; and
 coupling means between the HTP and the aircraft, which comprises

HTP pivoting means including a pivoting shaft around which the HTP rotates with respect to the aircraft; and an HTP trim system including actuating means connected to the aircraft to cause a HTP tilting movement with respect to the aircraft and about the pivoting shaft of the HTP pivoting means, the HTP trim system further including tilting means connected to the actuating means and pivotally connected to the HTP via a tilting shaft to translate the HTP tilting movement about the pivoting shaft, wherein the coupling means between the high-lift device and the HTP includes a deflection shaft mounted to deflect the movable leading edge high-lift device with respect to the HTP in response to each HTP tilting movement, wherein the coupling means between the HTP and the aircraft further comprise deflection transmission means to deflect the movable leading edge high-lift device, the deflection transmission means providing a high-lift device deflection movement about the deflection shaft for each HTP tilting movement about the tilting shaft, and wherein the deflection shaft is mounted to the HTP at a location forward of the tilting shaft in a leading edge direction of the HTP.

2. The system for increasing controllability of an aircraft with an adjustable HTP according to claim 1, wherein the deflection transmission means includes a mechanical linkage connected between the movable leading edge high-lift device and the aircraft.

3. The system for increasing controllability of an aircraft with an adjustable HTP, according to claim 1, wherein the movable leading edge high-lift device is a Droop Nose device.

4. The system for increasing controllability of an aircraft with an adjustable HTP, according to claim 1, wherein the deflection transmission means provide the movable leading edge high-lift device deflection movement in an opposite direction to the HTP tilting movement.

5. The system for increasing controllability of an aircraft with an adjustable HTP, according to claim 1, wherein the deflection transmission means deflects the movable leading edge high-lift device in a substantially parallel orientation with the HTP during an interval of the HTP tilting movement around an aligned position of the HTP relative to a horizontal plane of the aircraft.

6. The system for increasing controllability of an aircraft with an adjustable HTP, according to claim 1, wherein the deflection transmission means comprise a guide mechanism with a guide along which a bar pivotally slides, the bar being integrally connected with the movable leading edge high-lift device.

7. The system for increasing controllability of an aircraft with an adjustable HTP, according to claim 1, wherein the deflection transmission means comprise a bar mechanism with a first bar, the first bar being pivotally connected to the aircraft and also pivotally connected with a second bar which is integrally connected to the movable leading edge high-lift device.

8. The system for increasing controllability of an aircraft with an adjustable HTP, according to claim 7, wherein the second bar of the bar mechanism that is integrally connected to the movable leading edge high-lift device essentially consists of a yoke, the yoke being pivotally connected to at least one bar which is pivotally connected to the aircraft via an anchor shaft.

9. The system for increasing controllability of an aircraft with an adjustable HTP, according to claim 1, wherein the actuating means include a jack-screw that is threaded connected to the tilting means.

10. The system for increasing controllability of an aircraft with an adjustable HTP, according to claim 9, wherein the tilting means include a threaded female piece that is threaded to the jack-screw and fixed to two knuckles, one knuckle of the two knuckles for each left and right parts of the HTP.

11. The system for increasing controllability of an aircraft with an adjustable HTP, according to claim 1, wherein the movable leading edge high-lift device is secured on a leading edge side of the HTP.

12. The system for increasing controllability of an aircraft with an adjustable HTP, according to claim 1, wherein an elevator is secured on a trailing edge side of the HTP.

13. The system for increasing controllability of an aircraft with an adjustable HTP, according to claim 1, wherein the deflection shaft is mounted to the HTP at a location forward of the pivoting shaft in a leading edge direction of the HTP.

14. The system for increasing controllability of an aircraft with an adjustable HTP, according to claim 1, wherein the tilting shaft is pivotally connected to the HTP at a location forward of the pivoting shaft in a leading edge direction of the HTP.

15. The system for increasing controllability of an aircraft with an adjustable HTP, according to claim 1, wherein the deflection transmission means deflects the movable leading edge high-lift device at a downward angle in a leading edge direction of the HTP in response to a HTP tilting movement tilting the HTP with an upward angle in the leading edge direction.

16. The system for increasing controllability of an aircraft with an adjustable HTP, according to claim 1, wherein the deflection transmission means deflects the movable leading edge high-lift device at an upward angle in a leading edge direction of the HTP in response to a HTP tilting movement tilting the HTP with an downward angle in the leading edge direction.

* * * * *